United States Patent [19]

Niedermayr

[11] Patent Number: 4,642,902
[45] Date of Patent: Feb. 17, 1987

[54] APPARATUS FOR DETERMINING THE DEVIATIONS FROM A CIRCULAR FORM IN A DYNAMICALLY BALANCED PART

[75] Inventor: Erich Niedermayr, Munich, Fed. Rep. of Germany

[73] Assignee: Siemens Aktiengesellschaft, Berlin and Munich, Fed. Rep. of Germany

[21] Appl. No.: 738,475

[22] Filed: May 28, 1985

[30] Foreign Application Priority Data

Jun. 26, 1984 [DE] Fed. Rep. of Germany ....... 3423547

[51] Int. Cl.$^4$ .............................................. G01B 7/28
[52] U.S. Cl. ........................................ 33/543; 33/550; 364/560
[58] Field of Search ...................... 33/178 E, 504, 550, 33/520, 542, 543; 364/560, 563

[56] References Cited

U.S. PATENT DOCUMENTS

| | | | |
|---|---|---|---|
| 3,426,437 | 2/1969 | Rebhun et al. | 33/504 X |
| 3,649,820 | 3/1972 | Totsuka et al. | 364/560 |
| 3,866,829 | 2/1975 | Egawa et al. | 33/550 X |
| 4,026,031 | 5/1977 | Siddall et al. | 364/560 X |
| 4,027,527 | 6/1977 | Bennett et al. | 364/563 X |
| 4,030,201 | 6/1977 | Possati et al. | 33/504 |
| 4,070,762 | 1/1978 | Siddall | 33/550 X |

OTHER PUBLICATIONS

*Lexikon der Fertigungstechnik und Arbeitsmaschinen*, Deutsche Verlags-Anstadt, Stuttgart, 1968, vol. 9, pp. 213-214.

*Primary Examiner*—William D. Martin, Jr.
*Attorney, Agent, or Firm*—Hill, Van Santen, Steadman & Simpson

[57] ABSTRACT

An apparatus for determining deviations of a circular form of a dynamically balanced part characterized by a spindle which can be set in approximate alignment with the axis of the unit under test, an interval sensor rotated around the spindle axis for radially sensing a circumferential surface of the unit under test and electronic signal processing unit for separating a deviation signal component of the sensor signal created by a deviation from the circular form that is detected from other signal components of the sensor signal which are created from an eccentric setting of the spindle with respect to the axis of the unit under test. As a result of such a signal analysis, errors occurring from the eccentric spindle setting are practically avoided. Thus, no high demands are made for the spindle setting when making, for example, a roundness check of a steel pipe.

14 Claims, 6 Drawing Figures

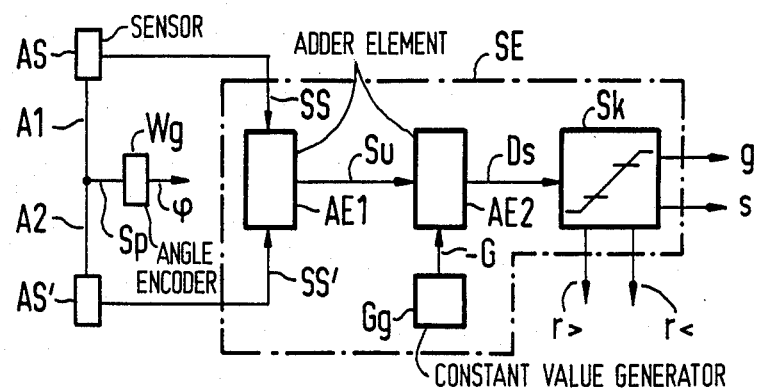
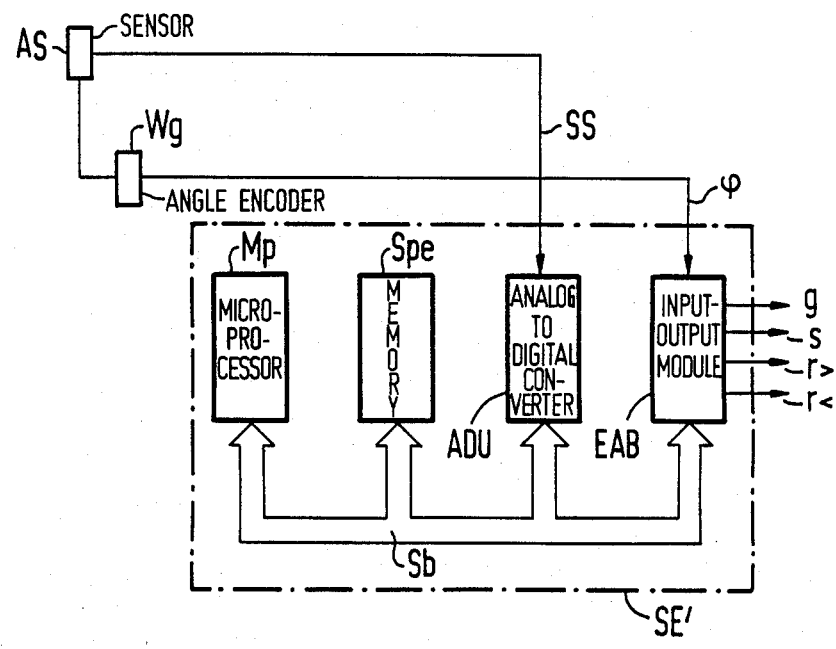

APPARATUS FOR DETERMINING THE DEVIATIONS FROM A CIRCULAR FORM IN A DYNAMICALLY BALANCED PART

BACKGROUND OF THE INVENTION

The present invention relates to an apparatus for determining deviations from a circular form in a dynamically balanced part, in particular, a steel pipe. The apparatus includes a spindle which can be set in approximate alignment with the axis of the unit being tested and an interval sensor mounted for rotation around an axis of the spindle axis for radially sensing a circumferential surface of the unit under test.

When laying steel pipe lines for natural gas and the like, the individual pipe sections are welded to one another directly in situ. In order to be able to properly draw the welds, the end regions of the pipe sections cannot have any inadmissibly great deviations from a circular form such as being out-of-round, outward dents, inward dents or weld bosses or bulges. Since such unallowed deviations from the circular form are frequently not noticed until the weld is being formed, they can lead to considerable difficulties at the construction site. In order to avoid these difficulties that can be overcome only with difficulty at the construction site, the end regions of the pipe sections to be welded to one another must have been subjected to a prior roundness check so that the pipe sections having unallowed deviations from a circular form can be either reworked to provide the desired circular form or set aside.

For a roundness check or, respectively, for determining deviations from a circular form in a dynamically balanced part, it is known to employ a so-called spindle measuring device wherein a spindle must first be set in alignment with the axis of the unit under test. The sensing then occurs radially wherein either the unit under test is rotated or the caliper is rotated. The excursion of the measuring sensor is then pneumatically or electrically amplified and is then recorded with a polar recorder. The deviations from the circle are then determined from the polar diagram as the difference in the diameters of two concentric circles between which the circumferential line of the polar diagram lies. This deviation as well as explanations of different ways of determining it are set forth in *Lexikon der Fertigungstechnik und Arbeitsmaschinen,* Deutsche Verlags-Anstalt, Stuttgart, 1968, Vol. 9, Pages 213-214.

Since an eccentric setting of a spindle is expressed as an error or deviations from a circular form that is being tested, the spindle for the known measuring devices for roundness checks should be set in alignment with the axis of the unit under test as precisely as possible. When testing hollow cylindrical parts such as steel pipes and the like, however, the spindle can only be approximately aligned to the axis of the unit under test so that the spindle adjustment implemented with justifiable outlay allows only imprecise measurements of the deviations from a circular form.

SUMMARY OF THE INVENTION

The object of the present invention is to create an apparatus for determining deviations from a circular form in a dynamically balanced part which with a simple and rugged structure enables a fast, precise roundness check of steel pipes and similar parts.

This object is achieved by an improvement in an apparatus for determining deviations from a circular form in dynamically balanced parts comprising a spindle which can be set in approximate alignment with the axis of the unit under test and an interval sensor being rotatable around the spindle axis for radially sensing a circumferential surface of the unit under test and providing a sensor signal. The improvements are an electronic signal processing means for separating a deviation signal component of the sensor signal which occurs from a deviation of the circular form to be detected from other signal components of the sensor signal which other components occur from an eccentric setting of the spindle with respect to the axis of the unit under test.

The invention is based on the perception that an adjustment of the spindle that is only approximately in alignment can be conspicuously accepted given a corresponding electronic signal processing of the signal from the sensor signal generated by the distance sensor. This is accomplished by providing an electronic signal processing means or device which separates the signal components of the sensor signal derived from the deviation from the circular form to be detected and the other signal components occurring from the eccentric spindle setting from one another and thus enables a separate evaluation of the signal component based on deviations from a circular form.

In the preferred embodiment of the apparatus of the invention, the sensor signal and a second signal having the same signal curve but phase-shifted by a rotational angle of the spindle of 180° are addable in the signal processing device or means. As a result of the addition and of the phase shift of the two signals, the cosine oscillation caused by an eccentric spindle setting can be eliminated in a particularly simple manner. This elimination of the cosine oscillation then also practically corresponds to an elimination of the signal component of the sensor signal that is based on the eccentric setting of the spindle.

In another development of the invention, a constant part is subtractable in the signal processing device from the sum signal formed from the sensor signal and the second signal so that the constant part corresponds to the diameter of a standard circle assigned to the unit under test. The outside circumference or the inside circumference of the unit under test can be employed as a standard circle so that any potential deviation from the circular form can be directly indicated in terms of amount and direction as deviations from the standardized outside diameter or, respectively, inside diameter of the unit under test.

The signal component of the sensor signal based on the detected deviations from the circular form can also be monitored for upward or, respectively, downward transgression of a prescribable tolerance threshold whereby, for example, a pipe section having inadmissibly high deviations from a circular form for welding connections can be cut out in a particularly simple fashion.

In accordance with another preferred development of the invention, an angle indicator or encoder is allocated to the spindle. With the assistance of this angle indicator, the spatial position of an identified deviation from a circular form can be indicated or, respectively, marked via the allocated rotational angle of the spindle.

A particularly simple structure of the signal processing unit occurs in that the second signal can be generated by a second distance sensor rotatable around the spindle axis wherein the distance sensor and the second distance sensor are disposed to be diametrically opposite one another with respect to the spindle axis. The formation of the second signal with the signal curve phase-shifted by 180° thus occurs outside of the signal processing unit by means of the second distance sensor. Expediently, the sum signal and the second signal are then supplyable to an adder element of the signal processing unit. The subtraction of the constant part then simply occurs in that the sum signal formed in the adder element and a signal corresponding to the negative constant part are supplyable to a second adder element. The difference signal formed in the second adder element can then be supplied to a threshold comparator which enables a fast good or bad statement on the basis of the prescribable tolerance thresholds.

In accordance with another preferred embodiment of the signal processing unit, the sensor signal is supplyable to a memory of the signal processing unit which memory has 360 memory locations with one location allocated for each degree of the 360° of the rotational angle for the spindle. The sensor signal and the second signal phase-shifted by a rotational angle of 180° can then be read out of this memory in a corresponding fashion. The sum signal is preferably supplyable to the memory via an analog-to-digital converter. In this case, the digitized sensor signal values of respectively two memory locations of the memory allocated to a rotational angle offset by 180° can then be added with the assistance of a microprocessor. The upward or downward transgression of prescribable tolerance thresholds is then also expediently monitored by the microprocessor.

In accordance with a further embodiment of the invention, the signal processing unit is disposed rotatably with the spindle. No slip rings or similar transmission devices are then required for the transmission of the sensor signal and under given conditions of the second signal. When a battery, which is rotatable with the spindle, is additionally provided to provide the voltage supply for the signal processing unit, then a particularly simple structure that is especially suited for portable devices for determining deviations from circular forms is obtained.

For a simple structure and a simple application of the apparatus, it is also expedient when the spindle is seated in a mount that can be slipped onto the unit under test. Such mounts are particularly suited for the roundness check of steel pipes.

BRIEF DESCRIPTION OF THE DRAWINGS

FIG. 5 is a circuit diagram of a signal processing unit in accordance with the present invention; and FIG. 6 is a second embodiment of the signal processing unit in accordance with the present invention.

DESCRIPTION OF THE PREFERRED EMBODIMENTS

Figure 1:
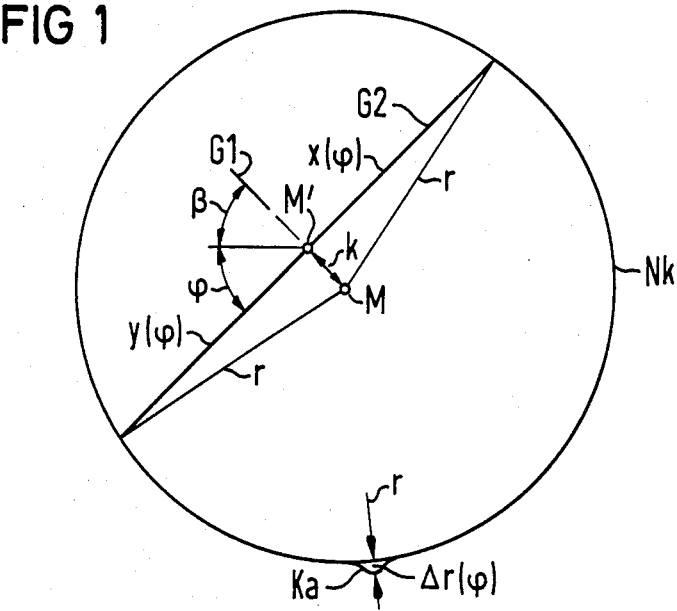
FIG. 1 is a circular drawing illustrating the principle underlying the present invention for measuring roundess of a cylinder.

As illustrated in FIG. 1, a circle NK has a radius r and a center M. A deviation Ka from the circular form in the form of a bulge is indicated at a location on the circumference as a deviation from the ideal circular shape of the standardized circle NK. A second point M' is also shown in FIG. 1 and has a distance k from the center point M wherein the direction of this eccentricity k is shown by an angle $\beta$ between a horizontal and a straight-line G1 that extends through the center M and the point M'. When a straight-line G2 is then placed through the point M' and this straight-line is rotated around the point M' with the rotational angle $\phi$, then distances x($\phi$) and y($\phi$) between the point M' and the circumference of the standardized circle NK will be derived on the straight-line G2 dependent on the eccentricity k and on the rotational angle. With the assistance of elementary angle relationships and the cosine set, the following relationships are found for x($\phi$) and y($\phi$):

$$x(\phi) = k \cdot \cos(\phi + \beta) + \sqrt{r^2 - k^2 \sin^2(\phi + \beta)}$$

$$y(\phi) = k \cdot \cos(\phi + 180° + \beta) + \sqrt{r^2 - r^2\sin^2(\phi + 180° + \beta)}$$

$$= -k \cdot \cos(\phi + \beta) + \sqrt{r^2 - k^2 \sin^2(\phi + \beta)}$$

Figure 2:
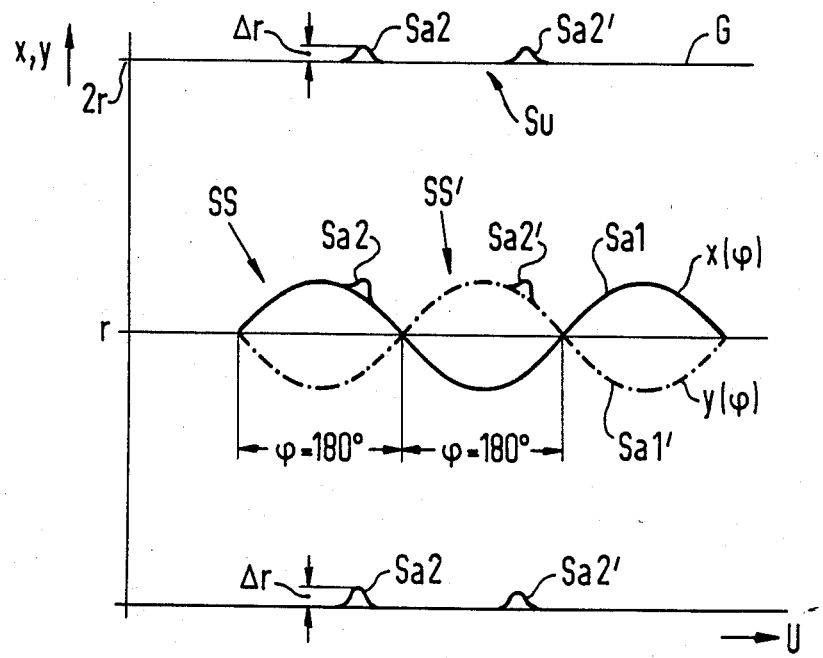
FIG. 2 is a graph showing deviations with respect to angle of revolution, a curve illustrating the sum of the deviations and a curve illustrating the deviations minus a fixed amount.

These distances x($\phi$) and y($\phi$) are shown in FIG. 2 as a function of the revolutions U of the straight-line G2. As may be seen, it is a matter of two oscillations that oscillate around a radius r of the standardized circle NK and are phase-shifted by a rotational angle of $\phi = 180°$. The two oscillations are thereby essentially a matter of cosine oscillations. By addition of the distances x($\phi$) and y($\phi$), this cosine oscillation caused by the eccentricity k of the point M' can be eliminated. The remaining terms are thus $$x(\phi) + y(\phi) = 2\sqrt{r^2 - k^2 \sin^2(\phi + \beta)} .$$

When it is assumed that the standardized circle NK is a matter of the standardized inside diameter of a steel pipe and that the point M' is the pivot point of the spindle of an apparatus for determining deviations from a circular form, then a maximum eccentricity of +3 mm can be guaranteed without difficulty given, for example, pipe diameters of about 150 to 500 mm. Thereby deriving is an error $$x(\phi) + y(\phi) = 2r\sqrt{1 - (k/r)^2 \sin^2(\phi + \beta)} .$$

With $k/r \leq 2\%$, a maximum error given $\phi + \beta = 90°$ derives at $$x(\phi) + y(\phi) = 2r\sqrt{1 - (0.002)^2}$$

$$= 0.9997 \cdot 2r.$$

The influence of the squared sine component can be neglected in the square root for the desired measuring precision and thus we have x($\phi$)+y($\phi$)=2r. When the distance x($\phi$) is measured with the assistance of a distance sensor rotatable around the point M', then the sensor signal SS shown in FIG. 2 will occur. This sensor signal SS has the signal component Sa1 for the eccentricity k of the point M' and a signal component Sa2 for the deviation Ka from the circular form which is to be detected and as illustrated in FIG. 1. A second signal SS' corresponding to the distance y($\phi$) can be generated either by a phase shift of the sensor signal SS by a rotational angle of $\phi=180°$ or by a second distance sensor. Accordingly, the second signal SS' has a signal component Sa1' based on the eccentricity k and a deviation signal component Sa2' based on the deviation from the circular form to be detected.

The relationship $x(\phi)+y(\phi)\cong 2r$ applies to the ideal standardized circle NK. When deviations from a circular form Ka appear, then $x(\phi))+y(\phi)=2r\pm\Delta r(\phi)$ applies, wherein $\pm\Delta r(\phi)$ is a matter of the amount of the deviation Ka from the circular form measured in a radial direction given the rotational angle $\phi$. According to FIG. 2, an addition of the sensor signal SS and of the second sensor signal SS' yields a sum signal Su with a constant part G and the deviation signal component Sa2 and Sa2' which are for the deviation Ka from the circular form that is being detected. When the constant part or term G, which corresponds to twice the radius r of the standardized circle NK, is subtracted from the sum signal Su, then only the deviation signal components Sa2 and Sa2' remain and these correspond to the value $+\Delta r(\phi)$ and thus indicate the deviation Ka from the circular form allocated to the rotational angle $\phi$ in terms of the amount and direction. The deviations Ka from the circular form which occur exactly diametrically opposite one another and oppositely identical as bulges and dents can thus not be recognized. However, the occurrence of such faults can be considered extremely improbable. Moreover, this case can also be avoided if the signal component Sa1 and the sensor signal SS is not cut out by addition of the second signal phase-shifted by a rotational angle of 180° but by means of a suitable circuit or, respectively, alogorithms for the elimination of the cosine oscillation.

Figure 4:
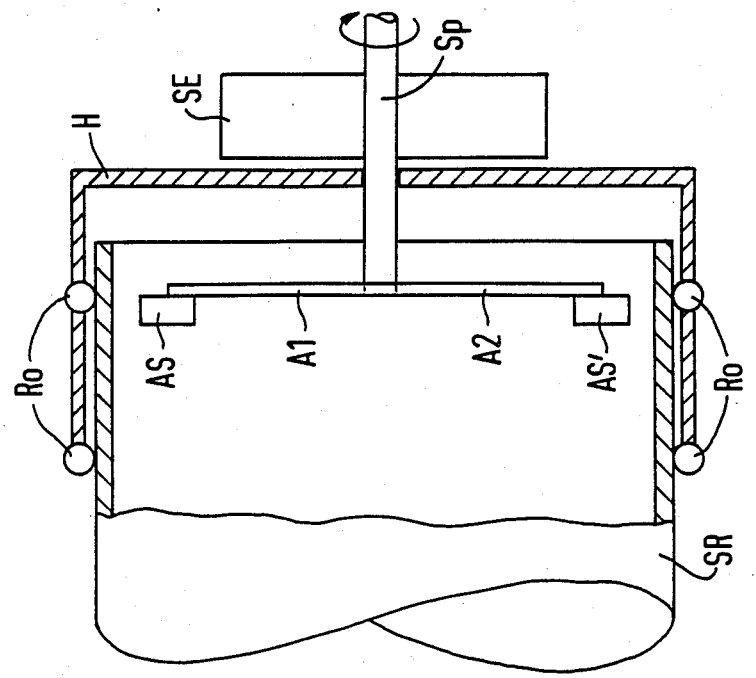
FIG. 4 is a side view with portions broken away for purposes of illustration of the apparatus of FIG. 3 installed on a steel pipe.
Figure 3:
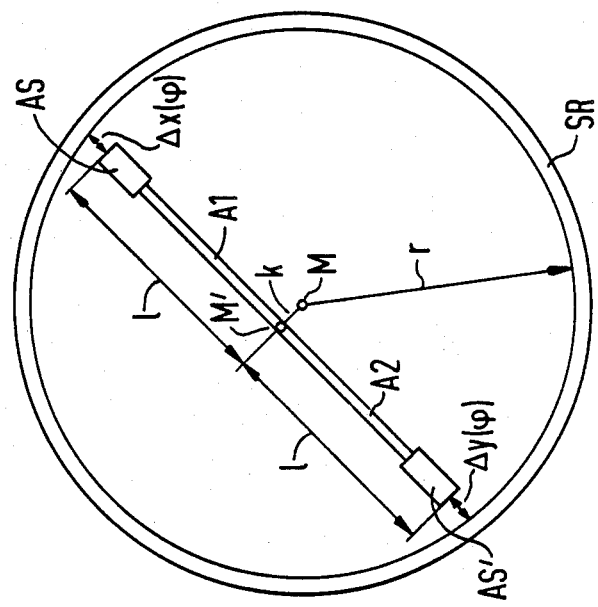
FIG. 3 is an end view of an apparatus in accordance with the present invention for measuring the interior of a steel pipe.

An apparatus for determining deviations from the circular form of a steel pipe is illustrated in FIGS. 3 and 4 in a greatly simplified, schematic illustration. Corresponding to the designations selected in FIG. 1, M in FIG. 3 references the ideal center of a steel pipe SR with M' being the pivot point or axis of a spindle Sp (FIG. 4) and with k being the eccentricity of the pivot point M' from the center M. The spindle Sp is seated in a mount H, which is matched to the outside diameter of the steel pipe SR and this mount is slipped over the outside circumference of the steel pipe SR with the assistance of three roller pairs Ro resiliently seated in arms that are offset by angles of 120°. The mount H then aligns the spindle Sp with sufficient precision in an approximate alignment with the pipe axis M. Two arms A1 and A2 of the same length and extending in a radial direction are secured to that end of the spindle Sp and project into the steel pipe SR. These arms carry distance or interval sensors AS and AS', respectively at their ends and the sensors face outwardly or diametrically opposite with respect to the pivot point M'. The distance or interval sensors AS and AS' are, for example, inductive distance or interval sensors and are rugged and reliable and have a good precision. The length of the arm A1 and A2 is dimensioned such that the measuring face of the interval sensors AS and AS' have the same respective distance l from a pivot point M' and that the distance or interval $\Delta x(\phi)$ and $\Delta y(\phi)$ dependent on the rotational angle $\phi$ remain to the inside circumference of the steel pipe SR. When, for example, the steel pipe has a nominal inside diameter of 500 mm, then the corresponding standardized circle NK (FIG. 1) has a radius of r = 250 mm and the arms A1 and A2 are set to l=245 mm so that an undisturbed rotation of the spindle Sp is guaranteed given a maximum eccentricity $k=\pm 3$ mm.

By utilizing the relationship of FIG. 1, the relationship in FIG. 3 is $x(\phi)=1+\Delta x(\phi)$ and $y(\phi)=1+\Delta y\phi)$.

The sensor signal SS and the second sensor SS' can thus be corrected by the interval l whereby the signal processing then occurs in accordance with FIG. 2. However, in accordance with the relationship $x(\phi)+y(\phi)\cong 2(r-l)\pm\Delta r(\phi)$, signals corresponding to the distances $\Delta x$ and $\Delta y$ are also added whereby a constant component G is then subtracted. This constant component G corresponds to the amount $2(r-l)$. In both instances, the signal processing occurs by means of a signal processing means or unit SE which is indicated in FIG. 4 by a block rotatable with the spindle Sp. As a consequence of this arrangement, the signal transmission from the interval sensors AS and AS' to the signal processing means SE can occur without slip rings or the like. It is then also expedient in this case to also additionally provide a battery for the voltage supply of the signal processing unit in the block or housing rotatable with the spindle Sp.

The first illustrative embodiment of the signal processing means SE is illustrated in FIG. 5. As may be seen, sensor signal SS of the interval sensor AS and the second signal SS' of the second interval sensor AS' are supplied to an adder element AE1 which forms the sum signal Su. The constant component G is subtracted from the sum signal Su in a second adder element AE2 to form a difference signal Ds. The constant component G with a negative operation sign is generated in a constant value generator Gg and corresponds to the amount 2r or $2(r-l)$ depending upon whether or not the interval is taken into consideration by the sensor signal SS and in the second signal SS' in accordance with FIG. 3. The difference signal Ds formed in the second adder element AE2 is then supplied to a threshold comparator Sk, which monitors the difference signal Ds corresponding to the deviation signal component Sa2 shown in FIG. 2 for upward transgression or downward transgression of prescribable tolerance thresholds. When the detected deviation Ka from a circular form as illustrated in FIG. 1 do not upwardly or downwardly transgress these tolerance thresholds, then a "good" signal g is generated by the comparator Sk. However, a "bad" signal s is generated otherwise and this indicates that the investigated steel pipe SR of FIGS. 3 and 4 is not suitable for welding at the construction site. The threshold comparator also generates signals "r>" and "r<" which indicate whether the detected deviations Ka from a circular form are, for example, a matter of indentations or bulges. Since all evaluation signals are present in real time, the location at which the fault was detected can be indicated by the rotational angle $\phi$ with a display or marking device. In FIG. 5, however, this is merely indicated by the angle encoder or indicator Wg driven by the spindle Sp which generates a signal corresponding to the respective rotational angle φ.

An embodiment of the signal processing unit is referenced SE' and illustrated in FIG. 6. The signal processing unit SE' is composed of a microprocessor Mp, a memory Spe, an analog-to-digital converter ADU and an input-output module EAB and these units are linked by a system bus Sb for the transmission of control information, addresses and data. Only the interval sensor AS secured on the arm A1 and rotatable around the spindle Sp is required for signal generation. Thus, the arm A2 with the second interval sensor AS' shown in FIGS. 3 and 4 can be eliminated. The sensor signal SS generated by the interval sensor AS is supplied to the analog-to-digital converter ADU whereas an angle signal φ generated by the angle encoder Wg in accord with the respective rotational angle of the spindle Sp is supplied to the input-output module EAB in the form of corresponding pulses. The digitized sensor signal SS is read into the memory Spe whose memory locations are allocated to 360 divisions of the rotational angle φ of the spindle Sp. When, for example, one memory location is provided for every angular degree, then the digitized sensor signal value of the memory locations for angles 0° and 180°, for angles 1° and 181°, for 2° and 182°, etc. can be added in the microprocessor Mp which corresponds to the addition of the sensor signal SS and the second signal SS' in the embodiment of FIG. 5. The microprocessor Mp also assumes the subtraction of the constant component G and the threshold operation of the threshold comparator Sk shown in FIG. 5 so that the input-output module EAB can output the signals "g", "s", "r>" and "r<" already explained in conjunction with the embodiment of FIG. 5. These signals are then also allocated to the respective rotational angle φ of the spindle.

As proceeds from the preceding explanation of FIGS. 1 through 6, a roundness check of a steel pipe and other dynamically balanced parts can be undertaken with the apparatus of the invention, this indicating the occurrence and the position of the inadmissible deviations from the circular form. According to DIN 7182, the deviation from a circle is the diameter difference of the two concentric circles between which the circumferential line lies. Departing from this definition, however, the positive and negative deviation from a circular form for the respective rotational angle of the spindle are separately identified, in particular with the apparatus of the present invention. According to the standard DIN 7182, however, the unroundness can also be expressed as the difference between the maximum positive deviation from circular form and the maximum negative deviation from the circular form of a standardized circle.

In the apparatus of the invention, the identification of deviations from a circular form does not depend on the rotational speed but only on the rotation or, respectively, the rotational angle of the spindle. For this reason, the spindle can be manually operated by a crank which is advantageous for roundness checks of steel pipes, particularly given portable apparatus. A measuring uncertainty that can potentially exist can be greatly curtailed by a multiple measurement during a plurality of revolutions of the spindle given a simultaneous turning or rotation of the spindle mount H relative to the unit under test.

In addition to the described sensing of the inside circumference of a unit under test, its outside circumference can also be sensed. To that end, the interval sensor or interval sensors are merely to be conducted around the outside of the unit under test which can be accomplished, for example, by means of a mount clampable in the unit under test or steel pipe and by means of a crimped or bent arm for the spindle.

Although various minor modifications may be suggested by those versed in the art, it should be understood that I wish to embody within the scope of the patent granted hereon, all such modifications as reasonably and properly come within the scope of my contribution to the art.

I claim:

1. In an apparatus for determining deviations from a circular form in dynamically balanced parts, particularly in steel pipes, said apparatus having a spindle, which can be set in approximate alignment with an axis of a unit under test and an interval sensor being rotatable around a spindle axis for radially sensing a circumferential surface of the unit under test and creating a sensor signal, the improvements comprising said apparatus including electronic signal processing means for separating a deviation signal component of the sensor signal which occurs for detected deviations from a circular form from other signal components of the sensor signal which other components occur for an eccentric setting of the spindle with respect to the axis of the unit being tested, said electronic signal processing means utilizing the first mentioned sensor signal and a second signal having the same signal curve as the first sensor signal but phase-shifted by 180° rotational angle of the spindle, said processing means having an adder element for adding the two signals to form a sum signal.

2. In an apparatus according to claim 1, wherein the signal processing means subtracts a constant component from the sum signal wherein the constant component corresponds to a diameter of the standardized circle allocated to the unit under test.

3. In an apparatus according to claim 1, wherein the electronic signal processing means monitors the deviation signal component of the sum signal for the direction of the transgression from a prescribable tolerance threshold.

4. In an apparatus according to claim 3, wherein an angle encoder is attached to the spindle to create a signal based on the angle of rotation.

5. In an apparatus according to claim 1, wherein the spindle has a second interval sensor mounted diametrically opposite from the first-mentioned interval sensor with respect to the spindle axis, said second interval sensor providing said second signal.

6. In an apparauts according to claim 5, wherein the electronic signal processing means includes a second adder element receiving the sum signal and adding a negative constant component thereto to form a difference signal.

7. In an apparatus according to claim 6, wherein the electronic signal processing means includes a threshold comparator receiving the difference signal.

8. In an apparatus according to claim 1, said apparatus has only one interval sensor, wherein the electronic signal processing means has a memory with a memory location for each of the degrees of the 360° of the rotational angle of the spindle and wherein said memory recives the sensor signal obtained from said one interval sensor at each of the degrees of the rotation of the spindle, said first and second sensor signals being taken from two memory locations allocated to degrees offset by 180°.

9. In an apparatus according to claim 8, wherein the electronic signal processing means includes an analog-to-digital converter for receiving the sensor signal and creating an additional signal which is supplied to the memory.

10. In an apparatus according to claim 9, wherein the electronic signal processing means includes a microprocessor for adding digital values of two sensor signals.

11. In an apparatus according to claim 10, wherein said microprocessor monitors the transgressions of the prescribable tolerance threshold determined by said means.

12. In an apparatus according to claim 1, wherein the signal processing means is mounted for rotation with the spindle.

13. In an apparatus according to claim 12, wherein a battery is mounted for rotation with the spindle to provide a voltage supply for the signal processing means.

14. In an apparatus according to claim 1, wherein the spindle is seated in a mount that can be slipped onto the unit to be tested.

* * * * *